UNITED STATES PATENT OFFICE.

EMIL A. BECKER, OF BUFFALO, NEW YORK.

PROCESS OF MAKING A FERTILIZER FROM TANK-WASTE.

SPECIFICATION forming part of Letters Patent No. 342,417, dated May 25, 1886.

Application filed February 25, 1886. Serial No. 193,203. (Specimens.)

*To all whom it may concern:*

Be it known that I, EMIL A. BECKER, a citizen of the United States, residing at Buffalo, in the county of Erie and State of New York, have invented certain new and useful Improvements in the Process of Manufacturing Fertilizing Material and its Product; and I do hereby declare the following to be a full, clear, and exact description of the invention, such as will enable others skilled in the art to which it appertains to make and use the same.

Heretofore various methods and compounds have been employed for converting the tank-liquors obtained from slaughter-houses or rendering establishments into commercial form, some of these methods requiring high degrees of heat and much time, and the materials thereby produced were at the close still sticky, while the results of others were materials either of a viscid or hygroscopic nature, and hence objectionable for handling in the trade.

The object of my improved process is to avoid these highly objectionable features, and thereby obtain a product which is at once a permanent merchantable article, ready for use at any time, either as an ingredient in the manufacture of fertilizers or as a complete fertilizer in itself, or by the addition of potash.

To this end my improved process consists in taking a quantity of wet tankage—*i. e.*, tankage either in its normal state as it comes from the tank, or that which has been pressed—such tankage consisting of meat, bone, animal tissue, and sometimes blood. This mass I place in a suitable receptacle and add to such and thoroughly mix therewith sulphuric acid in quantities proportioned to the amount of phosphate present in the tankage, whereby I dissolve the contained phosphates. To this mixture I then add and thoroughly mix therewith tank-water or tank-liquor, (which latter is condensed tank-water produced by partial evaporation,) and subject the whole mixture thus obtained for a sufficient period to a temperature varying from 180° to 250° Fahrenheit, the result being a dry substance entirely devoid of viscid or hygroscopic qualities, and always retaining its dryness without being affected by the atmosphere, which is a result not generally obtained, and at the same time I am enabled to dry the compound in a short time and at a comparatively low temperature, simultaneously with the dissolving of the phosphates by the acid, the resultant material retaining all of the phosphates dissolved.

I am aware that it has been proposed to produce a solution for treating phosphatic substances in the manufacture of manure by mixing sulphuric acid and concentrated tank or water liquor together; also that it has been proposed to add acids to the water in which fish has been boiled, then concentrate such liquid, and add the same to a fertilizer basis, as fish pomace or scraps, phosphatic rocks, bones, loams, &c.; but I am not aware that it has ever been proposed, before my invention thereof, to produce a fertilizer capable of immediate use by treating wet or pressed tankage with sulphuric acid, then adding thereto and thoroughly mixing therewith tank-water or tank-liquor in its normal state, and finally drying the compound. By thus subjecting the tankage while in a wet state to the action of the acid I am enabled to readily extract therefrom all of the phosphates therein and bring them to a condition to be intimately mixed with the nitrogen present in the tank water and liquor, and while subjecting the tank-water or tank-liquor to the action of the acid I secure the effectual separation of the fatty and other matter therein, and also secure the retention of all the nitrogen present therein.

By dissolving the phosphatic matter in the tankage with acid, as above described, the material obtains a consistency enabling it to readily absorb the tank water or liquor, and produces a homogeneous mass readily dried, so as to adapt it for immediate use as a fertilizer.

The compound as thus produced is in a condition to be placed in bags or other receptacles and placed on the market, and is adapted for immediate use as a fertilizer without further preparation or the addition thereto of other materials, the product being a very effective artificial ammoniated super-phosphate, at all times ready for the use of the farmer or manufacturer.

Having thus described my invention, what I claim is—

1. The process of manufacturing fertilizing materials, consisting, substantially, of mixing wet or pressed tankage with sulphuric acid in quantities proportioned to the phosphates present in the wet or pressed tankage, then adding tank-water or tank-liquor, and finally drying the mixture, substantially as set forth.

2. The fertilizing material herein described, consisting of wet or pressed tankage, sulphuric acid, and tank-water or tank-liquor intimately mixed together and dried, substantially as set forth.

In testimony whereof I have signed my name to this specification in the presence of two subscribing witnesses.

EMIL A. BECKER.

Witnesses:
CHAS. E. WILLIAMS,
GEO. C. BINGHAM.